United States Patent [19]

Sacchetti et al.

[11] Patent Number: 5,221,651
[45] Date of Patent: Jun. 22, 1993

[54] COMPONENT AND CATALYSTS FOR THE POLYMERIZATION OF OLEFINS

[75] Inventors: Mario Sacchetti, Ferrara; Gabriele Govoni, Renazzo; Antonio Ciarrocchi, Ferrara, all of Italy

[73] Assignee: Himont Incorporated, Wilmington, Del.

[21] Appl. No.: 977,724

[22] Filed: Nov. 16, 1992

Related U.S. Application Data

[63] Continuation of Ser. No. 912,451, Jul. 13, 1992, abandoned, which is a continuation of Ser. No. 515,390, Apr. 27, 1990, abandoned.

[30] Foreign Application Priority Data

Apr. 28, 1989 [IT] Italy .................. 20329 A/89

[51] Int. Cl.$^5$ .................................. B01J 31/00
[52] U.S. Cl. ............................. 502/126; 502/125; 502/127; 502/134
[58] Field of Search ............... 502/125, 126, 127, 134

[56] References Cited

U.S. PATENT DOCUMENTS

| | | | |
|---|---|---|---|
| 3,953,414 | 4/1976 | Galli et al. | 526/348 |
| 4,149,990 | 4/1979 | Giannini et al. | |
| 4,399,054 | 8/1983 | Ferraris et al. | 502/125 |
| 4,481,342 | 11/1984 | Invernizzi et al. | 502/125 |
| 4,487,845 | 12/1984 | Triplett | 502/107 |
| 4,522,930 | 6/1985 | Albizzati | 502/125 |
| 4,579,919 | 4/1986 | Staiger et al. | 502/125 |
| 4,673,719 | 6/1987 | Kioka et al. | 526/125 |
| 4,829,034 | 5/1989 | Iiskolan et al. | 502/111 |
| 4,978,648 | 12/1990 | Barbé et al. | 502/125 |
| 4,980,329 | 12/1990 | Barbe et al. | 502/125 |

FOREIGN PATENT DOCUMENTS 0065700 12/1982 European Pat. Off. .

Primary Examiner—Patrick P. Garvin
Assistant Examiner—E. D. Irzinski

[57] ABSTRACT

Spherical catalyst components for the polymerization of olefins comprising a titanium compound and optionally an electron-donor supported on anhydrous magnesium chloride, characterized by a surface area between 20 and 250 m$^2$/g, porosity between 0.25 and 0.5 cc/g, and an X-ray spectrum where the magnesium chloride reflections are present at 2 $v$ of 35° and 14.95°, or where the reflection at 35° is substituted by a halo with the maximum intensity between 33.5° and 35° and the reflection of 2 $v$ at 14.95° is absent.

18 Claims, No Drawings

COMPONENT AND CATALYSTS FOR THE POLYMERIZATION OF OLEFINS

This application is a continuation of application Ser. No. 07/912,451 filed Jul. 13, 1992 and now abandoned which is a continuation of application Ser. No. 07/515,390, filed Apr. 27, 1990 and now abandoned.

This invention refers to catalyst components for the polymerization of olefins, the catalysts obtained from them and the use of same in the polymerization of olefins such as ethylene, propylene and their mixtures.

Catalysts for the polymerization of olefins comprising a titanium halide supported on anhydrous magnesium halides in active form are described extensively in patent literature.

Patent literature has become abundant since the use of magnesium halides in active form as supports for Ziegler-Natta catalyst components was described for the first time in U.S. Pat. Nos. 4,298,718 and 4,495,338.

The most active forms of the magnesium halides are characterized by X-ray spectra where the maximum intensity reflection which appears in the spectrum of the nonactive halides is no longer present, but is substituted by a halo with the maximum intensity shifted towards the lower angles with respect to the one of the maximum intensity reflection in the nonactive halide.

In the less active forms of the magnesium chloride the maximum intensity reflection which appears at 2.56 Å ($2=\nu 35°$) is no longer present, but is substituted by a halo with a maximum intensity between the angles $2\nu$ of 33.5° and 35°; a reflection at $2\nu$ of 14.95° is always present.

The introduction in industrial practice of catalyst supported on magnesium chloride made possible significant simplifications to the polyolefin production processes. In particular, the possibility of obtaining catalysts in the form of spherical particles capable of producing polymers which duplicate the form of the catalyst, have satisfactory morphological characteristics (flowability and bulk density), and do not require granulation which, as is well known, is expensive in terms of energy use.

Examples of catalysts with controlled particle size are described in U.S. Pat. No. 3,953,414.

The polymer (polyethylene) which can be obtained with said catalysts has good morphological characteristics; the polymer productivity of these catalysts, however, is not very high (generally between 2,000 and 15,000 g/g catalyst). When the polymer yield rises to values higher than 20,000 g/g catalyst, the polymer particles formed are fragile and the apparent density is very low.

The catalyst components described in the above mentioned U.S. Pat. No. are obtained from an $MgCl_2 \cdot 6H_2O$ adduct spherulized in an apparatus of the dry cooling type, and then reacted with $TiCl_4$.

U.S. Pat. No. 4,399,054 describes catalyst components for the polymerization of olefins capable of producing polymer (polypropylene) with good flowability and bulk density characteristics. The polymer productivity of the catalyst is not very high (between 3,000 and 9,000 g/g catalyst; polymerization in heptane at 70° C. for 4 h with partial propylene pressure of 7 atm.).

The catalyst components are obtained from $MgCl_2$ adducts with alcohols, in the form of spherical particles containing generally 3 moles of alcohol.

Before the reaction with $TiCl_4$ the alcohol content is lowered to 2.5-2 moles in order to render the catalysts suitable to obtain non-fragile spherical form polymers. The alcohol content is never lowered below the 2 moles (this reduces drastically the activity of the catalyst).

In the case of magnesium chloride, at least in the less active forms (those where in the spectrum are present two halos with intensity peaks respectively between $2\nu$ angles from 30.45° to 31°, and from 33.5° to 35°), the reflection that in the nonactive magnesium chloride spectrum appears at $2\nu$ of 14.95° is still present.

Catalyst components, for the polymerization of $CH_2=CHR$ olefins, where R is hydrogen or an alkyl or aryl radical with 1-8 carbon atoms have now been found, suitable to obtain catalysts capable of producing polymers in the form of sperical particles with optimum morphological characteristics (flowability and high bulk density). Moreover, the catalysts have a significant catalytic activity and stereospecifity.

The catalyst components of the invention are in the form of spherical particles having an average diameter between 10 and 350 μm and comprise a titanium compound containing at least a Ti-halogen link, and optionally an electron-donor compound, supported on magnesium chloride. They are characterized by a surface area between 20 and 250 m²/g, porosity greater than 0.2 cc/g and comprised between 0.2 and 0.5 cc/g, X-ray spectrum (CuKd) where a) reflections at $2\nu$ of 35° and 14.95° (characteristic of magnesium chloride) are present, or b) where the reflection at $2\nu$ of 35° is substituted by a halo with a maximum intensity between the $2\nu$ angles of 33.5° and 35°, and the reflection at $2\nu$ of 14.95° is not present.

For the definition of the X-ray spectrum of magnesium chloride, reference is made to the standard ASTM D-3854. The registration of the spectrum is done using a copper anti-cathode and K α radiation.

The spectrum with the a) characteristic is peculiar of the catalytic components with surface area smaller than 70-80 m²/g and porosity greater than 0.4 cc/g. The spectrum with the b) characteristic is given by components with an area greater than 60 m²/g and porosity between 0.25 and 0.4 cc/g.

The pore volume distribution is such that more than 50% of the pores have a radius greater than 100 Å. In the components with area smaller than 100 m²/g, more than 70% of the pores have a radius greater than 100 Å.

As already indicated, the catalyst components of the invention supply catalysts suitable for the production of olefins (co)polymers in the form of spherical particles with valued morphologic characteristics (high bulk density values, flowability, and mechanical resistance). The average diameter of the polymeric particles is between 50 and 5000 μm.

In particular, catalysts obtained from components with surface area smaller than 100 m²/g and a porosity greater than 0.4 cc/g, are appropriately used in the preparation of ethylene polymers (HDPE and LLDPE). The catalysts have a very high activity and the spherical polymer obtained has attractive morphological characteristics (very high bulk density, flowability and mechanical resistance).

The catalysts obtained from components with surface area greater than 60-70 m²/g and porosity smaller than 0.4 cc/g are preferred for use in preparing crystalline propylene homo and copolymers, the so called impact copolymers obtained with sequential polymerization of 1) propylene, and 2) ethylene-propylene mixtures.

They are also advantageously used in the preparation of ethylene-propylene rubbers (EP rubbers), or ethylene-propylene-diene rubbers (EPDM rubbers), and of propylene polymer compositions which contain said rubbers.

It is surprising that with the catalysts of this invention said types of rubber in spherical particles with good flowability and bulk density characteristics can be obtained, because up to now it has not been possible to prepare elastomeric polymers of the above indicated type in flowable granular particles due to the insurmountable problems of the fouling of the reactors and/or the agglomeration of the particles.

Particularly in the case of polypropylene, using stereospecific catalysts obtained from components with a surface area around 60–70 m$^2$/g, porosity lower than 0.4 cc/g, and an X-ray spectrum of the type b), it is possible to obtain crystalline propylene homopolymers and propylene-ethylene copolymers, containing lesser portions of ethylene, characterized by very elevated porosity values which render them very attractive for the preparation of masterbatch with pigments and/or additives.

It is also surprising that the catalysts of the invention are highly active although the magnesium chloride in them gives X-ray spectra characteristic of the low active forms of the magnesium chloride itself.

Finally it is surprising and completely unexpected that the magnesium chloride is present in the crystalline form with an X-ray spectrum as the one indicated in b).

The preparation of the catalyst components is carried out in a variety of ways. The preferred method consists in starting with magnesium chloride/alcohol adducts containing alcohol moles in such a number that the adduct is solid at room temperature, but melted at temperatures between 100–130° C.

The number of alcohol moles vary with the different types of alcohol.

The alcohols suitable for use have the ROH formula where R is an alkyl, cycloalkyl, or aryl radical with 1–12 carbon atoms. It is also possible to use mixtures of said alcohols.

Examples of alcohols are methanol, ethanol, propanol, butanol, 2-ethylhexanol and their mixtures.

With alcohols such as ethanol, propanol, and butanol, the number of moles is about 3 per MgCl$_2$ moles. The alcohol and the magnesium chloride are mixed in an inert hydrocarbon liquid immiscible with the adduct, brought to the fusion temperature of the adduct. The mixture undergoes vigorous stirring [using for example an ULTRA TURRAX T-45N apparatus rotating at 2000–5000 RPM (Jonke & Kunkel K. G. IKG Werkel)].

The emulsion obtained is cooled in a very short time. This causes the solidification of the adduct in the form of spherical particles with the desired dimensions. The particles are dried and then subjected to a partial dealcoholation by heating it to temperatures going from 50° to 130° C.

The partially dealcoholated adduct is in the form of spherical particles with an average diameter between 50 and 350 μm, a surface area between 10 and 50 m$^2$/g and porosity from 0.6 to 2.5 cc/g (determined with a mercury porosimeter).

The higher the degree of dealcoholation, the higher the porosity. The pore volume distribution is such that more than 50% of the pores have a radius greater than 10,000 Å.

The dealcoholation is carried out until the alcohol contents are not greater than 2 moles per MgCl$_2$ mole, preferably comprised between 0.15 and 1.5 moles, particularly between 0.3 and 1.5 moles.

Whenever the dealcoholation is brought to values lower than 0.2 alcohol moles per MgCl$_2$ mole, the catalytic activity is considerably reduced.

The partially dealcoholated adduct is then suspended in cold TiCl$_4$ at a concentration of 40–50 g/l, and then brought to a temperature of 80°–135° C. and maintained at said temperature for 0.5–2 hrs. The excess TiCl$_4$ is separated hot via filtration or sedimentation.

The treatment with TiCl$_4$ is repeated one or more times if the alcohol content desired should be very low (generally less than 0.5% by weight).

During the preparation of a catalytic component containing an electron-donor compound, the latter is added to the TiCl$_4$ in quantities equal to molar ratios with respect to MgCl$_2$ between 1:6 and 1:16.

After the treatment with TiCl$_4$, the solid is washed with a hydrocarbon (e.g. hexane or heptane) and then dried.

According to another method, the melted adduct while in emulsion in an inert hydrocarbon is passed through a tube of the proper length under turbulent motion and then gathered in an inert hydrocarbon maintained at low temperature. Said method is described in U.S. Pat. No. 4,399,054 to which we make reference for the description. In this case as well the particles of the adduct are subjected to partial dealcoholization and reaction with TiCl$_4$.

As a variant to the methods described above the titanium compound, especially when it is solid at room temperature such as for instance the TiCl$_3$, is dissolved in the melted adduct which is then dealcoholated as indicated above and subjected to a reaction with a halogenating agent capable of reacting and separating the hydroxylic groups, such as for instance SiCl$_4$.

In the starting melted adduct, besides the titanium compound and optionally other transition metals, also co-supports such as AlCl$_3$, AlBr$_3$, ZnCl$_2$ may be included.

The titanium compounds suitable for the preparation of catalyst components, besides TiCl$_4$ and TiCl$_3$ and similar halides, also include other compounds with at least one Ti-halogen link, such as halogen alcoholates like trichlorophenoxytitanium and trichlorobutoxytitanium.

Finally the titanium compound can be used in mixtures with other transition metal compounds, such as V, Zr and Hf halides and halogen alcoholates.

As already indicated, the catalyst component may also contain an electron-donor compound (internal donor). This is necessary when the catalyst component must be used in the stereoregular polymerization of olefins such as propylene, 1-butene and 4-methyl-1-pentene.

The electron-donor compounds can be selected among compounds including ethers, esters, amines, ketones.

Preferred compounds are the alkyl esters, cycloalkyls and aryls of polycarboxyl acids, such as phthalic and maleic acids, and ethers of the formula

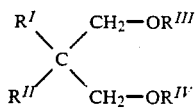

where $R^I$, $R^{II}$, same or different from each other, are alkyl, cycloalkyl or aryl radicals with 1-18 carbon atoms; $R^{III}$ and $R^{IV}$, same or different, are alkyl radicals with 1-4 carbon atoms.

Ethers of this type are described in U.S. patent application serial No. 359,234, filed May 31, 1989, the disclosure of which is incorporated herein by reference.

Examples representing said compounds are n-butyl phthalate, diisobutyl phthalate, di-n-octyl phthalate, 2-methyl-2-isopropyl-1,3-dimethoxypropane; 2-methyl-2-isobutyl-1,3-dimethoxypropane, 2,2-diisobutyl-1,3-dimethoxypropane, 2-isopropyl-2-isopentyl-1,3-dimethoxypropane.

The internal donor is generally present in molar ratios with respect to Mg of 1:8-1:14. The titanium compound expressed as Ti is present in a percentage between 0.5 and 10% by weight.

Al-alkyl compounds selected particularly among Al-trialkyls, such as Al-triethyl, Al-triisobutyl and Al-tri-n-butyl, are used as co-catalysts.

The Al/Ti ratio is greater than 1 and is generally 20-800.

In case of stereoregular polymerization of alpha olefins such as propylene and 1-butene, besides the Al-alkyl compound, usually, also an electron-donor compound (external donor is used). This compound may be the same as or different from the electron-donor compound present as internal donor.

When the internal donor is an ester of a polycarboxylic acid, especially a phthalate, the external donor is preferably selected among the silicon compounds of the formula $R_1R_2Si(OR)_2$, where $R_1$ and $R_2$ are alkyl, cycloalkyl or aryl radicals with 1-18 carbon atoms, and R is an alkyl radical with 1-4 carbon atoms. Examples representing these silanes are methyl cyclohexyl dimethoxysilane, diphenyl dimethoxysilane, methyl-t-butyl dimethoxysilane.

1,3-diethers with the formula previously shown may also be used advantageously.

If the internal donor is one of these diethers, there is no need to use an external donor, since the stereospecificity of the catalyst is in itself sufficiently high.

Catalysts containing an internal donor are used in the preparation of LLDPE with restricted molecular weight distribution. As already indicated, the catalysts are used in the polymerization of $CH_2=CHR$ olefins where R is a hydrogen, or an alkyl or aryl radical with 1-8 carbon atoms, and mixtures of said olefins with or without a diene.

The polymerization is done according to known methods operating in liquid phase, in the presence or absence of an inert hydrocarbon diluent, or in gaseous phase.

It is also possible to use liquid-gas mixed processes where in one or more stages the polymerization is carried out in liquid phase, and in one or more successive stages it is carried out in gaseous phase.

The polymerization temperatures are in general between 20° and 150° C., preferably between 60° and 90° C. The operation takes place at atmospheric pressure or higher.

The data shown in examples and text relative to the following properties have been determined according to the methods indicated below.

| Property | Method |
| --- | --- |
| MIL flow index | ASTM-D 1238 |
| MIE flow index | ASTM-D 1238 |
| MIF flow index | ASTM-D 1238 |
| Fraction soluble in xylene | (see Determination before Examples) |
| Isotacticity Index (I.I.) | Weight percentage of polymer insoluble in xylene at 25° C. Basically it conforms with the weight percentage of polymer insoluble in boiling n-heptane) |
| Surface area | B.E.T. (apparatus used SORPTOMATIC 1800 - C. Erba). |
| Porosity | Unless otherwise indicated, the porosity is determined with the B.E.T. method (see above). It is calculated from the integral pore distribution curve in function of the pores themselves. |
| Porosity (mercury) | Determined by immersing a known quantity of the sample in a known quantity of mercury inside a dilatometer and gradually hydraulically increasing the pressure of the mercury. The pressure of introduction of the mercury in the pores is in function of the diameter of same. The measurement is done using a porosimeter "Porosimeter 2000 Series" (C. Erba). The total porosity is calculated from the volume decrease of the mercury and the values of the pressure applied. |
| Bulk density | DIN-53194 |
| Flowability | The time taken by 100 g of polymer to flow through a funnel with an output hole of a diameter of 1.25 cm, and walls with an inclination of 20° on the vertical. |
| Morphology | ASTM-D 1921-63 |

DETERMINATION OF PERCENTAGE IN SOLUBLE XYLENE 2 g of polymer are dissolved in 250 ml of xylene at 135° C. while agitating. After 20 minutes the solution is left to cool, still under agitation, until it reaches 25° C.

After 30 minutes the precipitated material is filtered through filter paper the solution is evaporated in nitrogen current and the residue is dried under vacuum at 80° C. until it reaches constant weight.

Thus the percentage of polymer soluble in xylene at room temperature is calculated.

EXAMPLES

Preparation of MgCl$_2$/Alcohol Adducts

The MgCl$_2$/alcohol adducts in spherical particle form are prepared following the method described in example 2 of U.S. Pat. No. 4,399,054, but operating at 3,000 RPM instead of 10,000 RPM.

The adduct was partially dealcoholated by heat at increasing temperatures from 30° C. to 180° C. operating in nitrogen current.

PREPARATION OF THE SOLID CATALYST COMPONENT

In a 1 liter flask equipped with a condenser and mechanical agitator were introduced, under a nitrogen current, 625 ml of TiCl$_4$. At 0° C. while agitating were added 25 g of partially dealcoholated adduct. It was then heated up to 100° C. in 1 hour, when the temperature reaches 40° C. diisobutylphthalate (DIBF) was added in molar ratio Mg/DIBF=8.

The temperature was maintained at 100° C. for 2 hours, it was then left to decant and afterwards the hot liquid was syphoned off. 550 ml of $TiCl_4$ were added and it was heated to 120° C. for 1 hour. Finally it was left to settle and the liquid was syphoned off while hot; the residual solid was washed 6 times with 200 ml aliquote of anhydrous hexane at 60° C. and 3 times at room temperature.

The solid was then dried under vacuum.

POLYMERIZATION OF PROPYLENE

In a 4 l stainless steel autoclave equipped with an agitator and a thermostatic system, which had been degassed with nitrogen at 70° C. for 1 hour and then with propylene, was introduced at 30° C. without agitation but under light propylene flow, the catalytic system consisting of a suspension of the above solid catalyst component in 80 ml of hexane, 0.76 g of Al-triethyl and 8.1 mg of diphenyldimethoxysilane (DPMS). The suspension was prepared immediately prior to the test.

The autoclave was then closed and 1 Nl of $H_2$ was introduced. While agitating 1.2 kg of liquid propylene were charged and the temperature was brought to 70° C. in five minutes, maintaining the value constant for 2 hours.

At the end of the test, the agitation was stopped and any unreacted propylene was removed. Once the autoclave was cooled to room temperature, the polymer was recovered and then dried at 70° C. under nitrogen current in oven for 3 hours and then analyzed.

COPOLYMERIZATION OF ETHYLENE WITH BUTENE-1 (LLDPE)

The autoclave described above was degassed with propane instead of propylene. The catalytic system consisting of 25 cc of hexane, 1.05 g of Al-triisobutyl and the above catalyst component, was introduced in the autoclave at room temperature under light propane flow. The pressure was increased 5.5 atm with $H_2$ and then 2 atm with ethylene, prepolymerizing the ethylene until 15 g of ethylene were used (45°C.).

The propane and the hydrogen were degassed and after washing with $H_2$ the gaseous phase was formed with 37.0 g of 31.9 g of butene-1, and 1.8 atm of $H_2$ (total pressure 15 atm).

An ethylene-butene-1 mixture was then fed in a weight ratio of 9:1 at 70° C. for 2 hours At the end the autoclave was degassed and cooled rapidly to room temperature.

The recovered copolymer was dried at 70° C. in nitrogen for 4 hours in an oven.

POLYMERIZATION OF ETHYLENE

A 2.5 l stainless steel autoclave equipped with agitator and thermostatic system was flushed as described above for the test with propylene but using ethylene instead of propylene.

At 45° C. were introduced in $H_2$ current, 900 ml of a solution containing 0.5 g/l of Al-triisobutyl in anhydrous hexane and immediately afterwards, the catalyst component suspended in 100 ml of the above mentioned solution.

The temperature was rapidly brought to 70° C. and $H_2$ was fed until the pressure reached 3 atm., then ethylene up to 10.5 atm. These conditions were maintained for 3 hours replenishing continuously the ethylene depleted. At the end of the polymerization reaction, the autoclave was rapidly vented and cooled at room temperature.

The polymeric suspension was filtered and the solid residue dried in nitrogen at 60° C. for 8 hours.

EXAMPLE 1

A spherical $MgCl_2 \cdot 3EtOH$ adduct (obtained as indicated in the general method) was dealcoholated until an $EtOH/MgCl_2$ molar ratio of 1.7 was obtained.

A product with the following characteristics was obtained:
 porosity (mercury)=0.904 cc/g;
 surface area=9.2 m$^2$/g;
 bulk density=0.607 g/cc.

From this adduct, through the $TiCl_4$ treatment described in the general method, a solid catalyst component in spherical form was obtained with the following characteristics:
 Ti=2.5% by weight;
 DIBF=8.2% by weight;
 porosity=0.405 cc/g;
 surface area=249 m$^2$/g;
 bulk density=0.554 g/cc.

The X-ray spectrum of this component did not have reflections at 2 $\nu$ of 14.95° ; a halo with a maximum intensity of 2 $\nu$ of 34.72° was present instead.

This catalyst component was used in the polymerization of propylene following the technique described in the general section. Using 0.01 g of component 430 g of polymer were obtained with the following characteristics:
 fraction soluble in xylene at 25° C.=2.4%;
 MIL=2.5 g/10';
 bulk density=0.48 g/cc;
 morphology: 100% spherical particles with diameter between 1000 and 5000 μm;
 flowability: 10 sec.

EXAMPLE 2

By partially dealcoholating (according to example 1) a $MgCl_2 \cdot 3EtOH$ spherical adduct also obtained according to the method indicated in example 1, an adduct was prepared with an $EtOH/MgCl_2$ molar ratio of 1.5, and with the following characteristics:
 porosity (mercury)=0.946 cc/g;
 surface area=9.1 m$^2$/g;
 bulk density=0.564 g/cc.

From this adduct, through $TiCl_4$ treatment as indicated above, a spherical catalyst component was prepared with the following characteristics:
 Ti=2.5% weight;
 DIBF=8.0% weight;
 porosity=0.389 cc/g;
 surface area=221 m$^2$/g;
 bulk density=0.555 g/cc.

The X-ray spectrum of the component did not show reflections at 2 $\nu$ of 14.95°; only a halo was present with a maximum intensity at 2 $\nu$ of 2.5780°.

This catalyst component was used in the polymerization of the propylene using the procedure of example 1.

Using 0.015 g of catalyst component, 378 g of polypropylene were obtained with the following characteristics:
 fraction soluble in xylene at 25° C.=2.6%;
 MIL - 2.8 g/10';
 bulk density=0.395 g/cc;

morphology = 100% spherical particles with diameter between 1000 and 5000 μm;
flowability - 12 sec.

EXAMPLE 3

By partially dealcoholating (according to example 1) a MgCl$_2$.3EtOH spherical adduct obtained according to the method indicated in the preceding examples, an EtOH/MgCl$_2$ = 1 adduct was obtained which has the following characteristics:
- porosity (mercury) = 1.208 cc/g;
- surface area = 11.5 m$^2$/g;
- bulk density = 0.535 g/cc.

From said adduct, through TiCl$_4$ reaction, following the methodology described in the preceding examples, was obtained a spherical catalytic component with the following characteristics:
- Ti = 2.2% weight;
- DIBF = 6.8% weight;
- porosity = 0.261 cc/g;
- surface area = 66.5 m$^2$/g;
- apparent density = 0.440 g/cc.

The X-ray spectrum of the catalytic component showed a reflection at 2 $\nu$ of 14.95° as well as one at 2$\nu$ = 35°.

Using 0.023 g of the catalyst component in the propylene polymerization using the conditions in example 1, 412 g of polypropylene were obtained with the following characteristics:
- fraction soluble in xylene at room temperature = 3.0%;
- MIL - 3.2 g/10';
- bulk density = 0.35 g/cc;
- morphology = 100% spherical particles with diameter between 500 and 5000 μm;
- flowability - 12 sec.

Following the previous general description of the procedure for the copolymerization of ethylene with butene, 0.0238 g of catalyst component were used and 240 g of copolymer was obtained with the following characteristics:
- linked butene = 8.3% weight;
- fraction soluble in xylene at room temperature = 12.2%;
- MIE = 12 g/10';
- MIF = 12 g/10';
- MIF/MIE = 30 ;
- morphology = 100% spherical particles with diameter between 500 and 5000 μm.

EXAMPLE 4

By partially dealcoholating (according to example 1) a MgCl$_2$.3EtOH spherical adduct obtained according to the method indicated in the preceding examples, an EtOH/Mg = 0.4 adduct was obtained which had the following characteristics:
- porosity (mercury) = 1.604 cc/g;
- surface area = 36.3 m$^2$/g;
- apparent density = 0.410 g/cc.

By treating this support with TiCl$_4$ at a temperature of 135° C., at a concentration of 50 g/l, with three 1 hour treatments, a spherical catalyst component was obtained which, after the elimination of the excess TiCl$_4$, washing and drying, had the following characteristics:
- Ti = 2.6% weight;
- porosity = 0.427 cc/g;
- surface area 66.5 m$^2$/g.

The X-ray spectrum of this component showed a reflection at 2 $\nu$ of 14.95° as well as at 2 $\nu$ of 35°.

Using 0.012 g of catalyst component in the polymerization of ethylene according to the method described in the general section, 400 g of polyethylene were obtained with the following characteristics:
- MIE = 0.144 g/10';
- MIF = 8.87 g/10';
- MIF/MIE = 61.6
- morphology = 100% spherical particles with diameter between 1000 and 5000 μm;
- flowability = 12 sec.;
- apparent density = 0.38 g/cc.

EXAMPLE 5

By partially dealcoholating (as per example 1) a MgCl$_2$.3EtOH spherical adduct obtained according to the method indicated in the preceding examples, an adduct was obtained with EtOH/MgCl$_2$ molar ratio of 0.15 with the following characteristics:
- porosity (mercury) = 1.613 cc/g;
- surface area = 22.2 m$^2$/g.

The X-ray spectrum of this component showed a reflection at 2 $\nu$ of 14.95° as well as 2 $\nu$ of 35°.

Using 0.03 g of this component in the polymerization of ethylene, as described in example 4, 380 g of polyethylene were obtained with the following characteristics:
- MIE = 0.205 g/10';
- MIF = 16.42 g/10';
- MIF/MIE = 80.1;
- flowability = 12 sec.;
- bulk density = 0.40 g/cc.

EXAMPLE 6

A MgCl$_2$.1EtOH adduct was prepared according to the method in example 3, but using also a quantity of water diluted in the alcohol used for the preparation of the starting MgCl$_2$.3EtOH equal to 2% in weight.

The adduct after dealcoholation contained 3% in weight of water. With said adduct, after treatment with TiCl$_4$ and DIBF as described in example 1, a spherical catalyst component was obtained with the following weight composition:
- Ti = 2.35%;
- DIBF = 6.9%.

Using 0.025 g of this component in the polymerization of propylene as per example 1, 410 g of polymer in spherical particle form were obtained which had the following characteristics:
- fraction soluble in xylene at 25° C. = 3.1%;
- MIL = 3.0 10';
- apparent density = 0.35 g/cc;
- morphology = 100% of the spherical particles having a diameter between 100 and 5000 μm;
- flowability = 13 sec.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention and described and claimed.

We claim:

1. A catalyst component for the polymerization of olefins consisting essentially of a titanium compound containing at least one Ti-halogen link, and optionally an electron-donor compound, supported on anhydrous magnesium chloride, said catalyst component being obtained by reacting the titanium compound and electron-donor compound, when present, with a MgCl$_2$/ROH alcohol adduct, where R is an alkyl, cycloalkyl or alkylaryl radical with 1-12 carbon atoms, containing from 0.15 to less than 2 moles of alcohol per mole of MgCl$_2$, and having a surface area between 10 and 50 m$^2$/g, porosity from 0.6 to 2.5 cc/g and pore volume distribution such that at least 50% of the pores have a radius greater than 10,000 Å, said component further being in the form of spherical particles with an average diameter between 10 and 350 μm, surface area between 20 to 250 m$^2$g, porosity of 0.25 to 0.5 cc/g, having an X-ray spectrum where a) reflections at angle 2 ν of 35° and 2 ν of 14.95° are present, or b) where the reflection at 2 ν angle of 35° is no longer present but is substituted by a halo with a maximum intensity between angles 2 ν of 33.5° and 35°, and the reflection at angle 2 ν of 14.95° is not present.

2. The component of claim 1, wherein the electron-donor compound is present in molar ratio with the magnesium chloride between 1:4 and 1:20.

3. The component of claim 1, where the surface area is less than 100 m$^2$/g, the porosity is greater than 0.44 cc/g and having an X-ray spectrum of the type a).

4. The component of claim 2, where the surface area is less than 100 m$^2$/g, the porosity is greater than 0.44 cc/g and having an X-ray spectrum of the type a).

5. The component of claim 1 where the area is greater than 60 m$^2$/g, the porosity is between 0.2 and 0.4 cc/g, and having an X-ray spectrum of the type b).

6. The component of claim 2 where the area is greater than 60 m$^2$/g, the porosity is between 0.2 and 0.4 cc/g, and having an X-ray spectrum of the type b).

7. The component of claim where the pore volume distribution is such that at least 50% of them have a radius greater than 100 Å.

8. The component of claim 2 where the pore volume distribution is such that at least 50% of them have a radius greater than 100 Å.

9. The component of claim 1, where the titanium compound is TiCl$_4$.

10. The component of claim 2, where the electron-donor compound is selected among alkyl, cycloalkyl, or aryl esters of phthalic acid.

11. The component of claim 2, where the electron-donor compound is selected among 1,3-diethers of the formula:

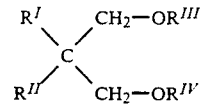

where R$^I$, R$^{II}$, same or different from each other, are alkyl, cycloalkyl or aryl radicals with 1-18 carbon atoms, R$^{III}$ and R$^{IV}$, same or different, are alkyl radicals with 1-4 carbon atoms.

12. The component of claim 1 where the titanium compound is present in quantity between 0.5% and 10% in weight, expressed as metallic Ti.

13. A catalyst for the polymerization of olefins, comprising the product of the reaction between a catalyst component of claim 1, and an Al-trialkyl compound.

14. A catalyst for the polymerization of olefins, comprising the product of the reaction between a catalyst component of claim 2, and an Al-trialkyl compound.

15. The catalyst of claim 13, where an electron-donor compound (external donor) is used in the preparation of the catalyst.

16. The catalyst of claim 14, where an electron-donor compound (external donor) is used in the preparation of the catalyst.

17. The catalyst of claim 13, where the solid catalyst component includes an electron-donor selected among alkyl, cycloalkyl and aryl esters of phthalic acid, and the external donor is selected among silicon compounds of the formula R$_1$R$_2$Si(OR)$_2$, where R$_1$ and R$_2$ equal or different are alkyl, cycloalkyl or aryl radicals with 1-18 carbon atoms, and R is an alkyl radical with 1-4 carbon atoms.

18. The catalyst of claim 13, where the external donor is selected among 1,3-diethers of the formula:

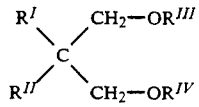

where R$^I$, R$^{II}$, same or different from each other, are alkyl, cycloalkyl or aryl radicals with 1-18 carbon atoms; and R$^{III}$ and R$^{IV}$, same or different, are alkyl radicals with 1-4 carbon atoms.

* * * * *